United States Patent
Wetzel et al.

(10) Patent No.: US 12,540,954 B2
(45) Date of Patent: Feb. 3, 2026

(54) MAGNETO-OPTICAL SENSOR FOR MONITORING OF A SEMICONDUCTOR ELEMENT IN A SEMICONDUCTOR MODULE

(71) Applicant: Siemens Aktiengesellschaft, Munich (DE)

(72) Inventors: Ulrich Wetzel, Adelsdorf (DE); Jürgen Zettner, Veitsbronn (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 18/278,766

(22) PCT Filed: Jan. 11, 2022

(86) PCT No.: PCT/EP2022/050380
§ 371 (c)(1),
(2) Date: Aug. 24, 2023

(87) PCT Pub. No.: WO2022/179763
PCT Pub. Date: Sep. 1, 2022

(65) Prior Publication Data
US 2024/0133924 A1    Apr. 25, 2024
US 2024/0230724 A9    Jul. 11, 2024

(30) Foreign Application Priority Data
Feb. 25, 2021    (EP) .................................... 21159313

(51) Int. Cl.
*G01R 15/24* (2006.01)

(52) U.S. Cl.
CPC .................................. *G01R 15/246* (2013.01)

(58) Field of Classification Search
CPC .............. G01R 15/246; G01R 33/0011; G01R 33/032; G01R 15/245; G01R 33/12;
(Continued)

(56) References Cited

U.S. PATENT DOCUMENTS 4,712,855 A * 12/1987 Tolksdorf ................ G02F 1/095
                                                              385/141
5,486,754 A    1/1996 Cruden et al.
(Continued)

FOREIGN PATENT DOCUMENTS

DE    102012002984 A1    8/2013
EP    3368359 A1    8/2018

OTHER PUBLICATIONS

Magneto-Optical Sensors; Koschny, Marco; Lindner, Morris; Richert, Hendryk, Quality (2012) vol. 51, S. 6 9; ISSN 03609936.
(Continued)

*Primary Examiner* — Vinh P Nguyen
(74) *Attorney, Agent, or Firm* — Henry M. Feiereisen LLC

(57) ABSTRACT

A magneto-optical sensor monitors a semiconductor element in a semiconductor module. The magneto-optical sensor is arranged in a region of the semiconductor element or of at least one of the feed lines of the semiconductor module that make contact with the semiconductor element. A polarized light signal is reflected from the magneto-optical sensor or transmitted through the magneto-optical sensor. A current is determined from a polarization of the reflected or transmitted light signal.

20 Claims, 7 Drawing Sheets

(58) Field of Classification Search
CPC ...... G01R 15/205; G01R 19/25; G01R 33/26; G01R 33/323; G01R 15/247; G01R 19/00; G01R 19/0092; G01R 15/24; G01N 24/006; G01N 27/725; G02F 1/09
See application file for complete search history.

(56) References Cited

U.S. PATENT DOCUMENTS

| | | | | |
|---|---|---|---|---|
| 7,254,286 | B2* | 8/2007 | Kochergin | G01R 33/0322 |
| | | | | 385/12 |
| 8,362,762 | B2* | 1/2013 | Hokari | G01R 33/032 |
| | | | | 324/244.1 |
| 8,773,119 | B2* | 7/2014 | Yuan | G01R 15/245 |
| | | | | 324/96 |
| 9,417,267 | B2* | 8/2016 | Dorner | G01R 15/246 |
| 10,191,091 | B2* | 1/2019 | Pfefferlein | G01R 15/246 |
| 11,333,688 | B2* | 5/2022 | Yao | G01K 11/3206 |
| 2013/0234698 | A1 | 9/2013 | Dorner et al. | |
| 2018/0217186 | A1 | 8/2018 | Pfefferlein et al. | |

OTHER PUBLICATIONS

Arakelyan Shant et al.; "Direct current imaging using a magnetooptical sensor"; Sensors and Actuators A: Physical; Elsevier BV; NL; vol. 238; Jan. 11, 2016; pp. 397-401; XP029399655; ISSN: 0924-4247; DOI: 10.1016/J.SNA.2016.01 .002; 2016.

Rapid Faraday Rotation on ε-Iron Oxide Magnetic Nanoparticles by Visible and Terahertz Pulsed Light; Shinichi Ohkoshi; Kenta Imoto; Asuka Namai; Marie Yoshikiyo; Seiji Miyashita; Hongsong Qiu; Shodai Kimoto; Kosaku Kato; Makoto Nakajima, Journal of the American Chemical Society, 2019, 141 (4), 1775-1780.

PCT International Search Report and Written Opinion of International Searching Authority mailed Sep. 5, 2022 corresponding to PCT International Application No. PCT/EP2022 filed Nov. 1, 2022.

* cited by examiner

MAGNETO-OPTICAL SENSOR FOR MONITORING OF A SEMICONDUCTOR ELEMENT IN A SEMICONDUCTOR MODULE

CROSS-REFERENCES TO RELATED APPLICATIONS

This application is the U.S. National Stage of International Application No. PCT/EP2022/050380, filed Jan. 11, 2022, which designated the United States and has been published as International Publication No. WO 2022/179763 A1 and which claims the priority of European Patent Application, Serial No. 21159313.2, filed Feb. 25, 2021, pursuant to 35 U.S.C. 119 (a)-(d).

BACKGROUND OF THE INVENTION

The invention relates to a method for monitoring at least one semiconductor element in a semiconductor module.

Further, the invention relates to a control unit having means for carrying out a method of this kind.

Moreover, the invention relates to a computer program for carrying out a method of this kind when it is run in a control unit.

Furthermore, the invention relates to the use of a magneto-optical sensor for determining a current in a semiconductor module.

In addition, the invention relates to a semiconductor module.

Semiconductor modules of this kind are used for example in a power converter in electrical drive technology. The term "power converter" should be understood to mean for example a rectifier, power inverter, frequency converter, or DC-to-DC converter. Power converters of this kind are constantly undergoing further optimization, resulting in the use of improved semiconductor materials, modified construction and connection technology, and improved heat dissipation concepts. In addition, monitoring solutions for monitoring the semiconductor modules are used. Optimization of this kind is in particular aimed at high power densities, compact constructions, a high degree of efficiency, and enhanced reliability.

The monitoring solutions comprise sensors, which make it possible for example to measure a load current, a gate voltage and/or a temperature. Sensors of this kind must not significantly affect the semiconductor elements and their peripheral equipment, which comprises for example the construction and connection technology, in particular feed lines. Further, a rapid response by the sensors to dynamic electrical events, in particular transient switching procedures, by the semiconductor elements is required—which may lie for example in the millisecond or even the microsecond range.

The article "Magneto-Optical Sensors" by Koschny, Marco; Lindner, Morris; Richert, Hendryk, *Quality* (2012) vol. 51, pp. 6-9; ISSN 03609936, describes the introduction of magneto-optical sensors for direct field visualization. The principle underlying magneto-optical sensors, the Faraday effect, is also mentioned.

The article "Rapid Faraday Rotation on ε-Iron Oxide Magnetic Nanoparticles by Visible and Terahertz Pulsed Light" by Shin-ichi Ohkoshi; Kenta Imoto; Asuka Namai; Made Yoshikiyo; Seiji Miyashita; Hongsong Qiu; Shodai Kimoto; Kosaku Kato; Makoto Nakajima, *Journal of the American Chemical Society*, 2019, 141 (4), 1775-1780, describes a magnetization reversal induced by visible-light pulsed lasers, and an ultrafast dynamic magneto-optical effect caused by pulsed laser irradiation in the terahertz range onto chemically synthesized magnetic films based on gallium-titanium-cobalt-substituted $\varepsilon\text{-Fe}_2\text{O}_3$ (GTC-$\varepsilon$-$\text{Fe}_2\text{O}_3$) and $\varepsilon\text{-Fe}_2\text{O}_3$ nanoparticles. Visible-light pulsed laser irradiation switches the sign of the Faraday effect in GTC-$\varepsilon\text{-Fe}_2\text{O}_3$ films. On the other hand, irradiating the $\varepsilon\text{-Fe}_2\text{O}_3$ film with pulsed THz light induces an ultrafast Faraday rotation in the extremely short time of 400 fs.

The content disclosed in the articles "Magneto-Optical Sensors" and "Rapid Faraday Rotation on ε-iron Oxide Magnetic Nanoparticles by Visible and Terahertz Pulsed Light" is incorporated in the present application by reference.

In this context, the object of the present invention is to specify a method for monitoring at least one semiconductor element in a semiconductor module, which is capable of detecting dynamic, in particular transient, events without significantly affecting the semiconductor elements and their peripheral equipment.

SUMMARY OF THE INVENTION

The object is achieved according to the invention by a method for monitoring at least one semiconductor element in a semiconductor module, wherein the semiconductor module has feed lines for making contact with the semiconductor element, wherein a magneto-optical sensor is arranged in the region of the semiconductor element or at least one feed line, wherein a polarized light signal is reflected by the magneto-optical sensor, wherein a current is determined from a polarization of the reflected light signal.

Further, the object is achieved according to the invention by a method for monitoring at least one semiconductor element in a semiconductor module, wherein the semiconductor module has feed lines for making contact with the semiconductor element, wherein a magneto-optical sensor is arranged in the region of the semiconductor element or at least one feed line, wherein a polarized light signal is transmitted by the magneto-optical sensor, wherein a current is determined from a polarization of the transmitted light signal.

Moreover, the object is achieved according to the invention by a control unit having means for carrying out a method of this kind.

Furthermore, the object is achieved according to the invention by a computer program for carrying out a method of this kind when it is run in a control unit.

In addition, the object is achieved according to the invention by the use of a magneto-optical sensor for determining a current in a semiconductor module.

Further, the object is achieved according to the invention by a semiconductor module having at least one semiconductor element and feed lines for making contact with the semiconductor element, a light source that is configured to generate a polarized light signal, a magneto-optical sensor that is arranged in the region of the semiconductor element or at least one feed line and is configured to reflect the polarized light signal generated by the light source, a detection unit that is configured to convert the reflected light signal into an electrical signal, and an evaluation unit that is configured to determine a current from a polarization of the reflected light signal.

Furthermore, the object is achieved according to the invention by a semiconductor module having at least one semiconductor element and feed lines for making contact with the semiconductor element, a light source that is configured to generate a polarized light signal, a magneto-optical sensor that is arranged in the region of the semiconductor element or at least one feed line and is configured to transmit the polarized light signal generated by the light source, a detection unit that is configured to convert the transmitted light signal into an electrical signal, and an evaluation unit that is configured to determine a current from a polarization of the transmitted light signal.

In addition, the object is achieved according to the invention by a power converter having at least one semiconductor module of this kind.

The advantages and preferred embodiments that are stated below in relation to the method may be applied to the control unit, the computer program, the use, the semiconductor module, and the power converter, where this is meaningful.

The invention is based on a consideration of how to improve sensor-based monitoring of a semiconductor element using a magneto-optical sensor for electrically isolated determination of a current in a semiconductor module. The magneto-optical sensor has a material, in particular a thin film, with magneto-optical properties. For example, the magneto-optical layer contains garnet. A magneto-optical sensor of this kind is arranged in the region of a semiconductor element or a feed line of the semiconductor element. A light source generates a polarized light signal which strikes the magneto-optical sensor and is transmitted or reflected. For example, on a side remote from the light source, the magneto-optical sensor comprises an in particular metal reflection layer for reflecting the light signal. Because of magneto-optical effects, which in the case of transmission are called the Faraday effect and in the case of reflection are called the Kerr effect, it is possible to detect magnetic fields, in particular quantitatively, as a result of the fact that electrically active optical crystals or liquids in the magneto-optical sensor cause a change in polarization that is dependent on the field strength of the magnetic field. The transmitted or reflected light signal is converted into an electrical signal by a detection unit, which comprises for example an opto-electronic converter with an upstream polarization filter. For example, the opto-electronic converter has at least one light-sensitive diode, for example a photodiode or a PIN diode. In particular, a light intensity of the transmitted or reflected light signal is converted into a current by at least one light-sensitive diode, for example a photodiode or PIN diode. On the basis of the polarization of the transmitted or reflected light signal, a current is determined in an evaluation unit. In the case of reflection of the light signal by the magneto-optical sensor, the light penetrates the same magneto-optical layer twice, on the way out and on the way back, with the result that the change in polarization is intensified. For this reason, it is possible to use for example a thinner layer. In particular, magneto-optical thin films have sufficient sensitivity to detect typical current densities—that is to say those of magnetic fields in the region of semiconductor elements. The current is determined by the magneto-optical sensor in electrically isolated manner, with the result that the semiconductor elements and their peripheral equipment are, at the least, not significantly affected.

A further embodiment provides for the polarized light signal to be guided to the magneto-optical sensor by way of a fiber-optic conductor. In particular, the fiber-optic conductor has optical fibers that are configured to maintain polarization. For example, the fiber-optic conductor has polymer fibers. The effect of the fiber-optic conductor is to reduce susceptibility to faults and save on installation space.

A further embodiment provides for the fiber-optic conductor, at least in part, and the magneto-optical sensor to be arranged to run within the substrate, wherein the polarized light signal is guided within the substrate, onto the magneto-optical sensor. In particular, at least part of the fiber-optic conductor and the magneto-optical sensor are integrated within the substrate such that fixing takes place, with the result that vibrations that may disrupt the detection of changes in polarization are suppressed, and in particular small angles of rotation in polarization that are magneto-optically induced are reliably detected. Further, integration into the substrate—which is called an electro-optical circuit board, EOCB for short—makes it possible to position the magneto-optical sensor closer and to miniaturize the sensor equipment.

A further embodiment provides for a two-dimensional current density distribution to be determined from the polarization of the light signal. For the purpose of determining a two-dimensional current density distribution, for example a two-dimensional detector array having a plurality of light-sensitive diodes and a large-surface magneto-optical sensor are used. In particular in the context of monitoring a too-dimensional current density distribution of the at least one semiconductor element, anomalies that may result in component failure can be detected at an early stage.

A further embodiment provides for the magneto-optical sensor to have a magneto-optical thin film, wherein a transient current signal, in particular having an amplitude dynamic of at least 100 and a rise time in the region of at most 10 µm, is detected. Typically, magneto-optical effects are highly dynamic, so magneto-optical layers can easily follow fast semiconductor transient currents during switching-on and switching-off procedures. In particular, fast light-sensitive diodes such as photodiodes can detect local transient currents in electrically isolated manner without complex switching.

A further embodiment provides for the transient current signal to be determined by undersampling. In particular in the case of periodic signals, undersampling enables an exact signal characteristic of the rapid transient current signal to be determined.

A further embodiment provides for the undersampling to be triggered by a frequency converter clock signal, wherein the frequency converter clock signal is subject to a defined delay. Triggering with the frequency converter clock signal makes reliable synchronization possible. A defined delay is produced for example by an in particular analog delay element, for example an all-pass circuit. A defined delay enables undersampling to be implemented simply and at low cost.

A further embodiment provides for a temperature of the magneto-optical sensor to be determined, wherein the current is determined in a manner dependent on the temperature of the magneto-optical sensor and the polarization of the light signal. The temperature of the magneto-optical sensor is for example optically with the aid of an additional IR light signal. The temperature-dependent polarization behavior can be calibrated empirically using a look-up table, a model and/or with the aid of a digital twin. Because polarization behavior of the magneto-optical sensor is temperature-dependent, the accuracy of determining the current is improved by in particular simultaneous measurement of the temperature of the magneto-optical sensor.

A further embodiment provides for the magneto-optical sensor to comprise a first magneto-optical material and a second magneto-optical material that differs from the first magneto-optical material in respect of sensitivity, wherein the first magneto-optical material is used for determining a first current, wherein the second magneto-optical material is used for determining a second current, and wherein the second current is larger than the first current. As a result, a greater measurement dynamic is achieved.

BRIEF DESCRIPTION OF THE DRAWING

The invention is explained and described in more detail below with reference to the exemplary embodiments illustrated in the figures, in which.

DETAILED DESCRIPTION OF PREFERRED EMBODIMENTS

Figure 1:
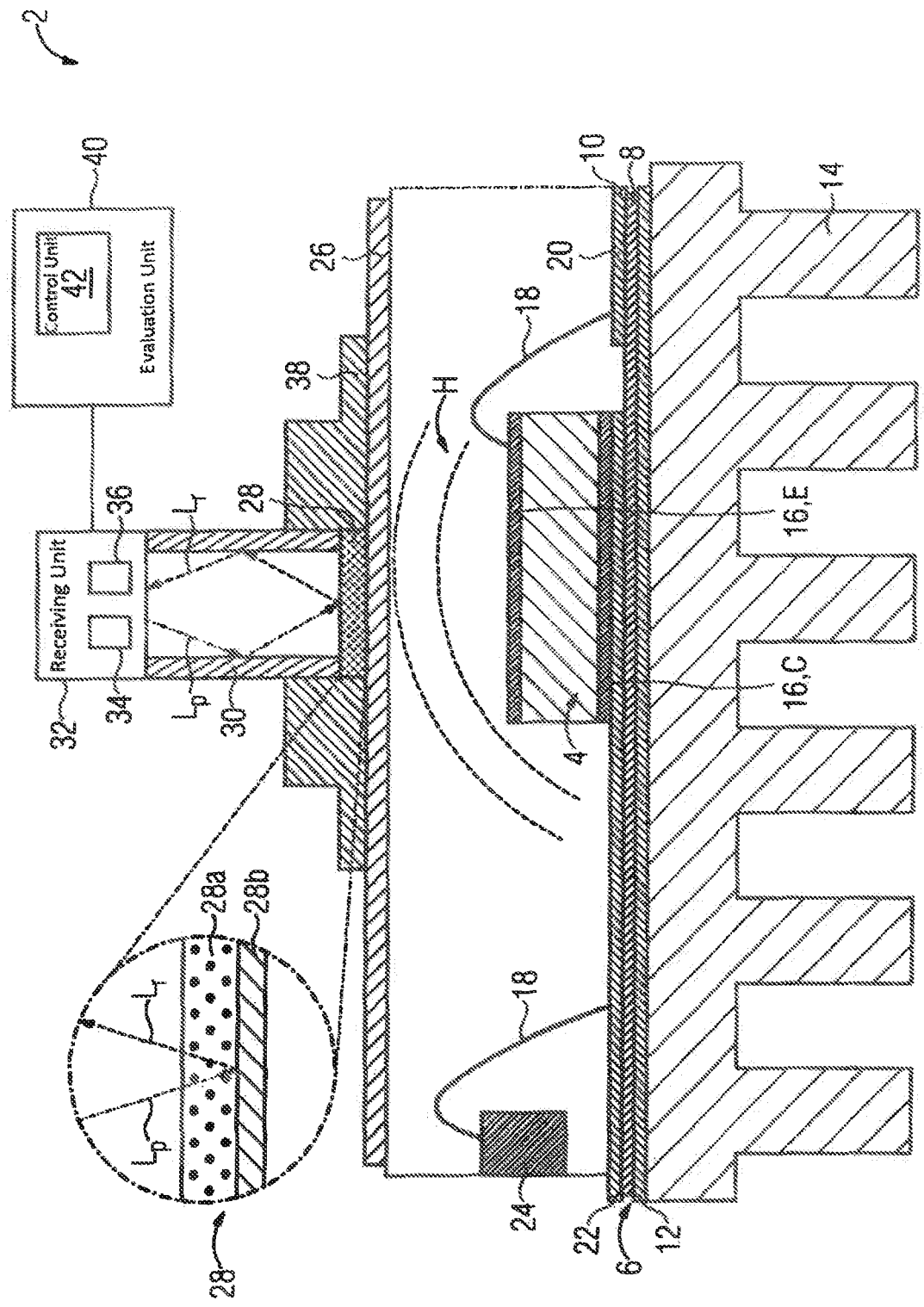
FIG. 1 shows a schematic illustration of a first embodiment of a semiconductor module, in cross section.

The exemplary embodiments explained below are preferred embodiments of the invention. In the exemplary embodiments, the described components of the embodiments each present individual features of the invention, to be considered independently of one another, which also each develop the invention independently of one another, and hence are also to be regarded as a constituent part of the invention individually or in a different combination from that shown. Furthermore, the described embodiments may also be supplemented by further features of the invention which have already been described.

Identical reference characters have the same meaning in the different figures.

FIG. 1 shows a schematic illustration of a first embodiment of a semiconductor module 2, in cross section. The semiconductor module 2 has a semiconductor element 4 and a substrate 6, wherein by way of example the semiconductor element 4 takes the form of an insulated-gate bipolar transistor (IGBT). The semiconductor element 4 may also take the form of a metal-oxide semiconductor field-effect transistor (MOSFET), a field-effect transistor, a diode, a logic gate, in particular a field programmable gate array (FPGA), or another semiconductor. In particular, the semiconductor element 4 has a surface area of at least 10 mm². The substrate 6 comprises a dielectric material layer 8 which contains a ceramic material, for example aluminum nitride or aluminum oxide, or an organic material such as a polyamide. Further, the dielectric material layer 8 has a thickness d of 25 µm to 400 µm, in particular 50 µm to 250 µm. In addition, on a side facing the semiconductor element 4, the substrate 6 comprises an in particular textured upper metallized element 10 and, on a side remote from the semiconductor element 4, it comprises a lower metallized element 12, wherein the upper metallized element 10 and the lower metallized element 12 are made for example from copper and are also called copper foil. The lower metallized element 12 of the substrate 6 is connected to a heat sink 14, in particular in a substance-to-substance bond.

On a side facing the substrate 6, the semiconductor element 4, which for example takes the form of an IGBT, has a contact-making element 16 in the form of a collector contact C, wherein a further contact-making element 16 in the form of an emitter contact E is arranged on a side remote from the substrate 6. A gate contact of the IGBT is not illustrated in FIG. 1, for reasons of clarity. The emitter contact E is connected to a first feed line 20 of the upper metallized element 10 of the substrate 6 by a bond connection 18, wherein the collector contact C of the semiconductor element 4 is connected in a substance-to-substance bond to a second feed line 22 of the upper metallized element 10 which is electrically insulated from the first feed line 20. The substance-to-substance bond is made by soldering or sintering. The second feed line 22 is connected to an electrical terminal element 24 by a bond connection 18. In addition, the semiconductor module 2 comprises a housing 26, which is made for example from a dielectric material, in particular a plastics material.

Further, the semiconductor module 2 has a magneto-optical sensor 28 that makes contact with the housing 26 above the semiconductor element 4. As a result of the arrangement illustrated in FIG. 1, and using the Kerr effect, the magneto-optical sensor 28 is configured to monitor a current, in particular a transient current, of the semiconductor element 4, wherein the magneto-optical sensor 28 is arranged in a magnetic field H of the semiconductor element 4, electrically isolated from the semiconductor element 4. The magneto-optical sensor 28 is constructed from a magneto-optical layer 28a, which contains for example garnet, and a reflecting layer 28b, which is applied to the magneto-optical layer 28a for example by sputtering. In particular, the magneto-optical layer 28a has a thin film with magneto-optical properties. The magneto-optical sensor 28 is connected to an optical transmitting and receiving unit 32, also designated an optical transceiver, by a fiber-optic conductor 30. The fiber-optic conductor 30 has optical fibers that are configured to maintain polarization. The optical transmitting and receiving unit 32 comprises a light source 34, which generates a polarized light signal Lp. For example, the light from a polarizer is polarized. The polarized light signal Lp is reflected by the reflecting layer 28b of the magneto-optical sensor 28, with the reflected light signal Lr striking a detection unit 36. The detection unit 36 has for example an opto-electronic converter with an upstream polarization filter that filters the reflected light signal Lr and converts it into an electrical signal. In particular, a light intensity of the reflected light signal Lr is converted into a current by at least one light-sensitive diode, for example a photodiode or PIN diode. The fiber-optic conductor 30 is connected to the housing 26 of the semiconductor module 2 by a plug connector 38. The electrical signal is further processed in an evaluation unit 40, wherein a current is determined from a polarization of the reflected light signal Lr. The evaluation unit 40 has a control unit 42.

In the evaluation unit 40, parallel to the time-related magnetic field measurements H(t) of the magneto-optical sensor 28 are drive pulses, in particular gate signals, with the result that transient current signals having for example an amplitude dynamic of at least 100 and a rise time in the region of at most 10 µm can be detected. It is likewise possible to determine the output at a particular instant.

Measurement of a polarization angle F(t) is the starting point, and within an actuation range of the magneto-optical sensor 28 there is, at any given point in time t, a linear relationship with current density I(t):

$$F(t)=C_{MO}\cdot H(t) C_{MO}\cdot I(t)/(2\pi\times r)$$

Taking into account intrinsic temperature effects of the embedded layers, first the spacing r and the polarization angle $C_{MO}=f(T)$ are dependent on temperature.

$$F(t,T)=C_{MO}(T)\cdot I(t)/(2\pi\cdot r(T))$$

Alternatively, the temperature dependence of the polarization angle may be determined as close to I(t)=0 and be used as a correction term. If the current I(t) at a particular instant is known, then working backward it is possible to determine a temperature.

The magneto-optical thin films have sufficient sensitivity to detect typical current densities—that is to say magnetic fields in the region of semiconductor elements 4. Further, magneto-optical effects are typically highly dynamic, so magneto-optical layers can easily follow fast semiconductor transient currents during switching-on and switching-off procedures. In particular, fast light-sensitive diodes such as photodiodes can detect local transient currents in reliably electrically isolated manner without complex switching.

Since polarization behavior of the magneto-optical sensor 28 is temperature-dependent, with polarization reducing as temperature increases, the accuracy of determining the current can be improved by in particular simultaneous measurement of the temperature of the magneto-optical sensor 28. For this purpose, a temperature of the magneto-optical sensor 28 is determined, for example optically with the aid of an additional IR light signal. Then, the current is determined in a manner dependent on the temperature of the magneto-optical sensor 28 and the polarization of the reflected light signal Lr. The temperature-dependent polarization behavior can be calibrated empirically using a lookup table, a model and/or with the aid of a digital twin.

Figure 2:
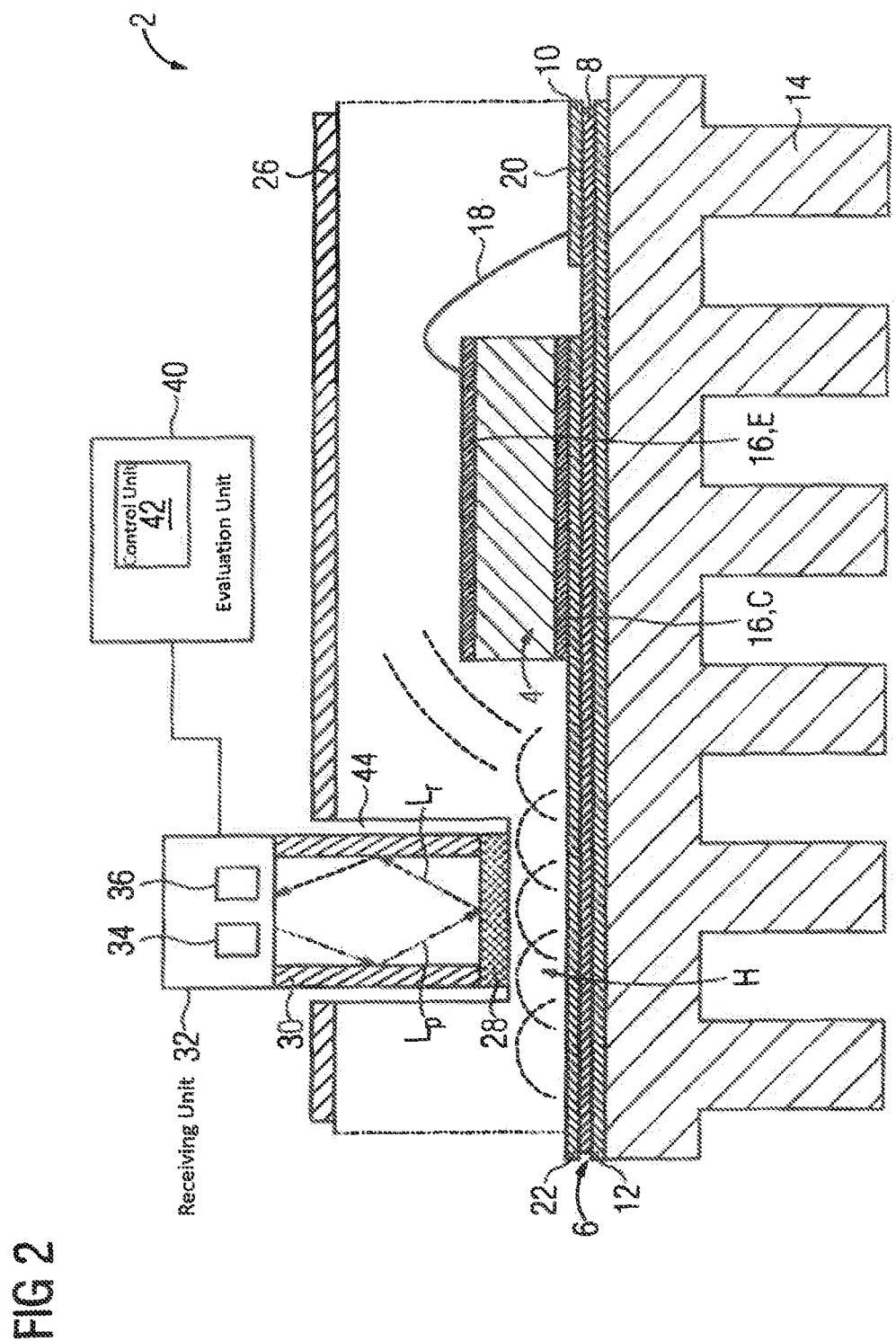
FIG. 2 shows a schematic illustration of a second embodiment of a semiconductor module, in cross section.

FIG. 2 shows a schematic illustration of a second embodiment of a semiconductor module 2, in cross section, wherein a magneto-optical sensor 28 is arranged in a cavity 44 in the housing 26, above the second feed line 22. As a result of the arrangement illustrated in FIG. 2, and using the Kerr effect, the magneto-optical sensor 28 is configured to monitor a current, in particular a transient current, in the region of the second feed line 22, wherein the magneto-optical sensor 28 is arranged in a magnetic field H of the second feed line 22. Otherwise, the construction of the semiconductor module 2 in FIG. 2 corresponds to that in FIG. 1.

Figure 3:
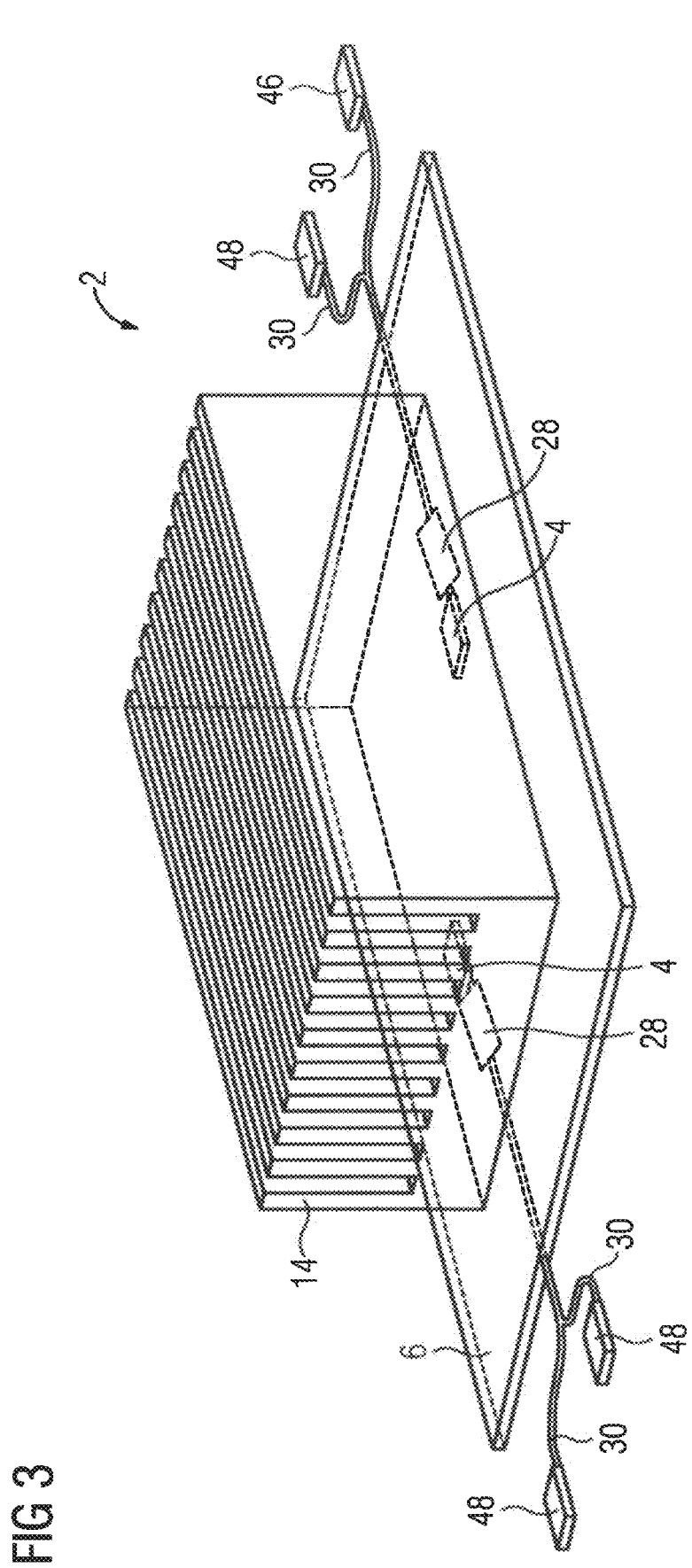
FIG. 3 shows a schematic three-dimensional illustration of a third embodiment of a semiconductor module.

FIG. 3 shows a schematic three-dimensional illustration of a third embodiment of a semiconductor module 2. Semiconductor elements 4 make contact on a substrate 6, wherein, on a side of the semiconductor elements 4 remote from the substrate 6, a heat sink 14 is thermally connected to the semiconductor elements 4. Arranged in the substrate 6 below the semiconductor elements 4 are magneto-optical sensors 28, which take the form of an "electro-optical circuit board", EOCB for short. The magneto-optical sensors 28 are configured to dynamically detect a local magnetic field and its transient characteristic, wherein this local magnetic field is used as a measure of the local current density and semiconductor temperature $T_{Junction}$. A polarized light signal Lp, generated by a light source 34, is guided from an optical transmitting unit 46 by way of a fiber-optic conductor to the magneto-optical sensor 28. The light signal Lr reflected by the magneto-optical sensor 28 is guided by way of a further fiber-optic conductor 30 to an optical receiving unit 48 which comprises a detection unit 36. In particular, the magneto-optical sensors 28 and fiber-optic conductors 30 are fixed in the EOCB, with the result that vibrations that may disrupt the detection of changes in polarization are suppressed. The optical transmitting units 46 and optical receiving units 48 are connected for example to a common evaluation unit 40, which is not illustrated in FIG. 3, for reasons of clarity. In particular, the light sources 34 are driven by a common control unit 42 of the evaluation unit 40. Otherwise, the construction of the semiconductor module 2 in FIG. 3 corresponds to that in FIG. 1.

Figure 4:
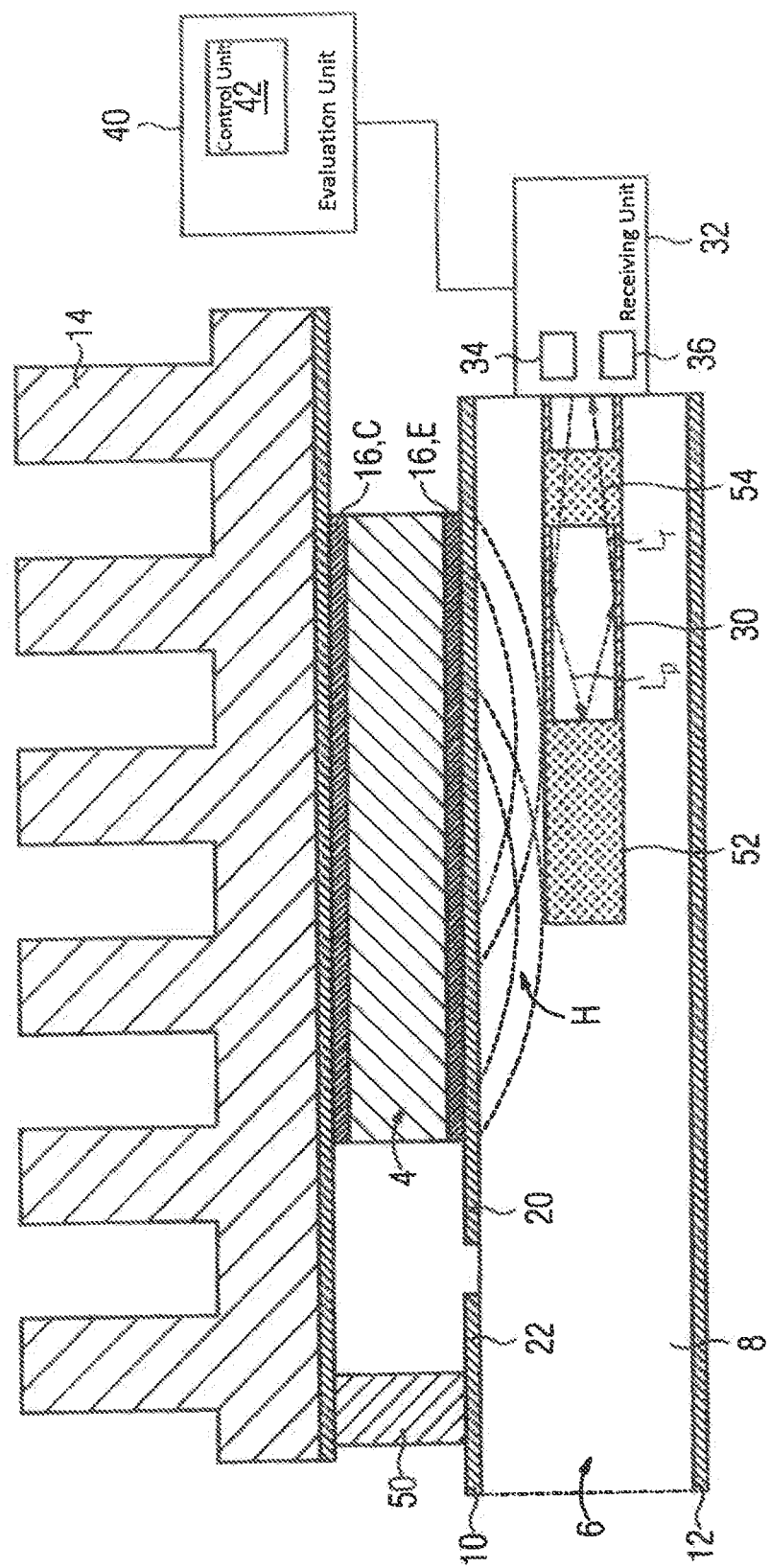
FIG. 4 shows a schematic illustration of a fourth embodiment of a semiconductor module, in cross section.

FIG. 4 shows, in cross section, a schematic illustration of a fourth embodiment of a semiconductor module 2, which has a substrate 6 on which there is connected a semiconductor element 4 taking the form for example of an IGBT. In particular, the semiconductor element 4 is of the flip-chip type and makes contact on the substrate 6 by a planar construction and connection technique, wherein the emitter E is connected to a first feed line 20 and the collector C is connected to a second feed line 22 by way of a spacer element 50. A gate contact of the IGBT is not illustrated in FIG. 4, for reasons of clarity.

A magneto-optical sensor 28, which is connected to an optical transmitting and receiving unit 32 by a fiber-optic conductor 30, is arranged to run within the substrate 6. The magneto-optical sensor 28 is integrated with a fiber-optic conductor 30 in a recess 52 in a dielectric material layer 8 of the substrate 6. A polarized light signal Lp, generated by a light source 34, is guided from the optical transmitting and receiving unit 32 by way of a polarizer 54 and the fiber-optic conductor to the magneto-optical sensor 28. The light signal Lr reflected by the magneto-optical sensor 28 is reflected by way of the fiber-optic conductor 30 and the polarizer 54 back to the optical transmitting and receiving unit 32. A current is determined in the evaluation unit 40, from a polarization of the reflected light signal Lr. Otherwise, the construction of the semiconductor module 2 in FIG. 4 corresponds to that in FIG. 3.

Figure 5:
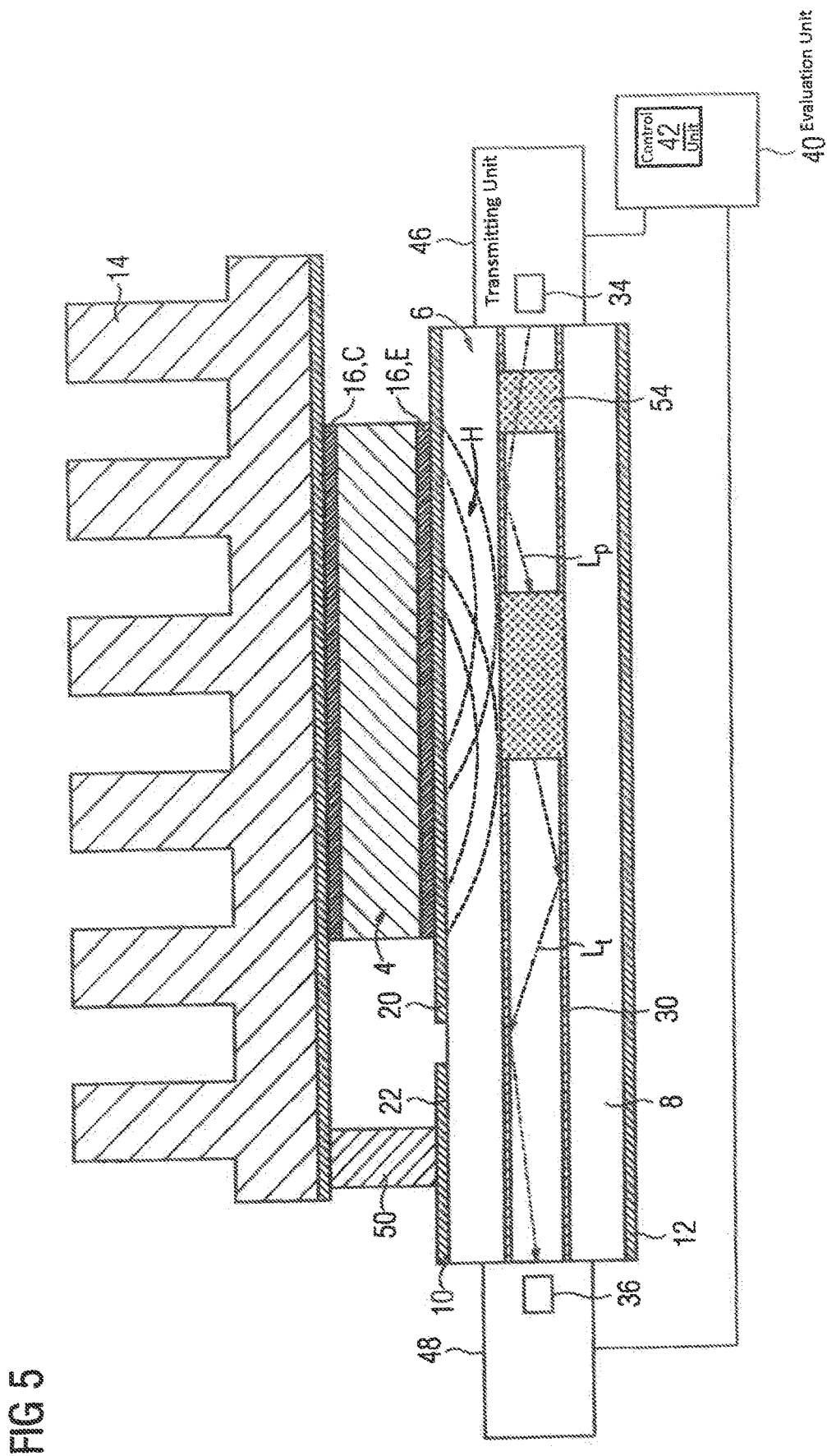
FIG. 5 shows a schematic illustration of a fifth embodiment of a semiconductor module, in cross section.

FIG. 5 shows a schematic illustration of a fourth embodiment of a semiconductor module 2, in cross section, wherein a polarized light signal Lp, generated by a light source 34, is guided from an optical transmitting unit 46 by way of a polarizer 54 and a fiber-optic conductor 30 to the magneto-optical sensor 28. The polarized light signal Lp is transmitted by the magneto-optical sensor 28, wherein the transmitted light signal Lt is guided by way of a fiber-optic conductor 30 to an optical receiving unit 48, which comprises a detection unit 36. A current is determined in the evaluation unit 40, from a polarization of the transmitted light signal Lt. Otherwise, the construction of the semiconductor module 2 in FIG. 4 corresponds to that in FIG. 4.

Figure 6:
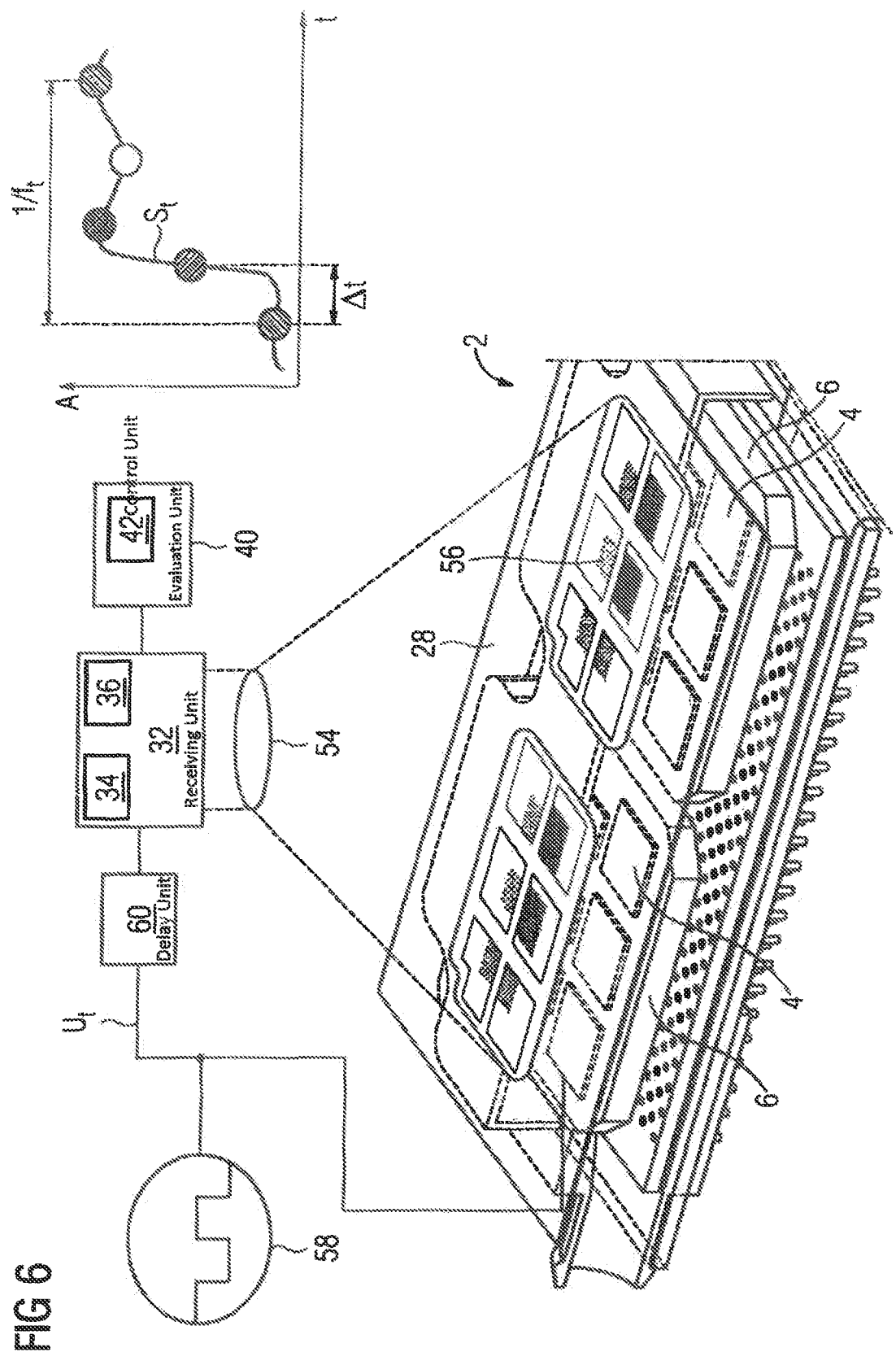
FIG. 6 shows a schematic illustration of a sixth embodiment of a semiconductor module.

FIG. 6 shows a schematic illustration of a sixth embodiment of a semiconductor module 2. The optical transmitting and receiving unit 32 takes the form of a camera, wherein the detection unit 36 of the camera has a two-dimensional detector array for determining a two-dimensional current density distribution 56. For this purpose, a magneto-optical sensor 28 having a large-surface magneto-optical layer 28 is used. A polarized light signal Lp, generated by a light source 34 facing the camera, is guided by way of a polarizer 54 to the large-surface magneto-optical sensor 28. The light signal Lr that is reflected by the magneto-optical sensor 28 is reflected back to the camera by way of the polarizer 54. A current is determined in the evaluation unit 40, from a polarization of the reflected light signal Lr.

In order to detect a transient current signal St that has an amplitude dynamic of at least 100 and a rise time in the region of at most 10 μm, undersampling is performed, triggered by a frequency converter clock signal Ut having a frequency ft and generated by a signal generator 58. For the undersampling, a delay element 60 subjects the frequency converter dock signal Ut to a defined delay Δt smaller than 1/ft. Otherwise, the construction of the semiconductor module 2 in FIG. 6 corresponds to that in FIG. 1.

Figure 7:
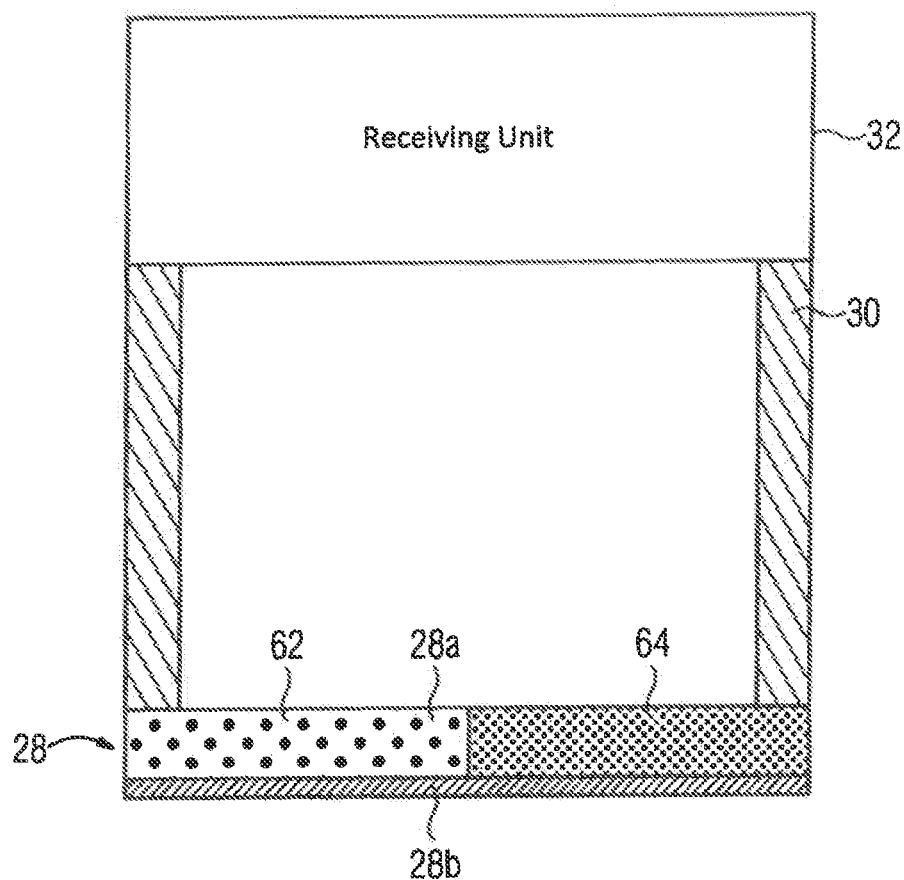
FIG. 7 shows an enlarged schematic illustration of a magneton optical sensor.

FIG. 7 shows an enlarged schematic illustration of a magneto-optical sensor 28 which comprises a first magneto-optical material 62 and a second magneto-optical material 64 that differs from the first magneto-optical material 62 in respect of sensitivity to field strength. As illustrated in FIG. 1, the magneto-optical sensor 28 is connected to an optical transmitting and receiving unit 32 by way of a fiber-optic conductor 30. The at least two magneto-optical materials 62, 64 can be used for different field strengths, with the result that it is possible to achieve a greater measurement dynamic.

Figure 8:
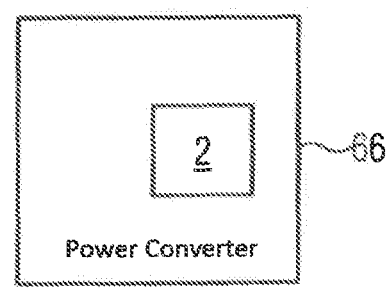
FIG. 8 shows a schematic illustration of a power converter having a semiconductor module.

FIG. 8 shows a schematic illustration of a power converter 66 having a semiconductor module 2. The power converter 66 may comprise more than one semiconductor module 2.

To summarize, the invention relates to a method for monitoring at least one semiconductor element 4 in a semiconductor module 2, wherein the semiconductor module 2 has feed lines 20, 22 for making contact with the semiconductor element 4. In order to be able to detect dynamic, in particular transient, events without significantly affecting the at least one semiconductor element 4 and its peripheral equipment, it is proposed that a magneto-optical sensor 28 be arranged in the region of the semiconductor element 4 or at least one feed line 20, 22, wherein a polarized light signal Lp is reflected by the magneto-optical sensor 28, wherein a current is determined from a polarization of the reflected light signal Lr.

The invention claimed is:

1. A method for monitoring a semiconductor element in a semiconductor module, wherein the semiconductor module comprises feed lines contacting the semiconductor element, the method comprising:
    arranging a magneto-optical sensor in a region of the semiconductor element or of at least one of the feed lines;
    reflecting a polarized light signal from the magneto-optical sensor or transmitting a polarized light signal through the magneto-optical sensor, and
    determining a current from a polarization of the reflected or transmitted light signal.

2. The method of claim 1, further comprising guiding the polarized light signal to the magneto-optical sensor by way of a fiber-optic conductor.

3. The method of claim 2, further comprising:
    arranging the magneto-optical sensor and at least a part of the fiber-optic conductor within a substrate of the semiconductor module; and
    guiding the polarized light signal onto the magneto-optical sensor within the substrate.

4. The method of claim 1, further comprising determining from the polarization of the reflected or transmitted light signal a two-dimensional current density distribution.

5. The method of claim 1, wherein the magneto-optical sensor comprises a magneto-optical thin film, and further comprising detecting a transient current signal having an amplitude dynamic of at least 100 and a rise time of at most 10 usec.

6. The method of claim 5, wherein the transient current signal is determined by undersampling.

7. The method of claim 6, further comprising triggering the undersampling with a clock signal from a frequency converter, wherein the clock signal is delayed by a defined delay.

8. The method of claim 1, further comprising:
    determining a temperature of the magneto-optical sensor; and
    determining the current as a function of the temperature of the magneto-optical sensor and the polarization of the reflected or transmitted light signal.

9. A computer program product, comprising a computer program embodied in a non-transitory computer readable medium, wherein the computer program, when loaded into a computer and executed by the computer, causes the computer to execute a method as set forth in claim 1.

10. A semiconductor module, comprising:
    a semiconductor element and feed lines for contacting the semiconductor element;
    a light source designed to generate a polarized light signal;
    a magneto-optical sensor arranged in a region of the semiconductor element or of at least one feed line and designed to reflect or transmit the polarized light signal generated by the light source;
    a detection unit designed to convert the reflected or transmitted polarized light signal into an electrical signal; and
    an evaluation unit designed to determine a current from a polarization of the reflected or transmitted polarized light signal.

11. The semiconductor module of claim 10, further comprising a fiber-optic conductor connecting the light source or the detection unit, or both, to the magneto-optical sensor.

12. The semiconductor module of claim 11, further comprising a substrate on which the semiconductor element is disposed, with the magneto-optical sensor and at least a part of the fiber-optic conductor running within the substrate.

13. The semiconductor module of claim 10, wherein the magneto-optical sensor is arranged at a distance of at most 1 mm from the semiconductor element or from at least one feed line.

14. The semiconductor module of claim 10, wherein the magneto-optical sensor comprises a first magneto-optical material and a second magneto-optical material that differs from the first magneto-optical material in respect of sensitivity.

15. The semiconductor module of claim 14, wherein the first magneto-optical material is used to determine a first current, and wherein the second magneto-optical material is used to determine a second current, which is larger than the first current.

16. The semiconductor module of claim 10, wherein the magneto-optical sensor comprises a magneto-optical thin film designed to detect a transient current signal having an amplitude dynamic of at least 100 and a rise time of at most 10 usec.

17. A control unit designed to drive light sources of the semiconductor module of claim 10, wherein the control unit is part of the evaluation unit.

18. A magneto-optical sensor for determining a current in a semiconductor module as set forth in claim 10, said magneto-optical sensor arranged in a region of the semiconductor element or of at least one feed line and designed to reflect or transmit the polarized light signal generated by the light source.

19. The magneto-optical sensor of claim 18, comprising a first magnetooptical material and a second magneto-optical material that differs from the first magneto-optical material in respect of sensitivity, wherein the first magnetooptical material is used to determine a first current, and wherein the second magneto-optical material is used to determine a second current, which is larger than the first current.

20. A power converter, comprising a semiconductor module as set forth in claim 10.

* * * * *